US006527837B2

(12) United States Patent
Kurosawa et al.

(10) Patent No.: US 6,527,837 B2
(45) Date of Patent: Mar. 4, 2003

(54) ROTOR AND SEALING DEVICE FOR ROTARY ADSORBER

(75) Inventors: Masaji Kurosawa, Inba-gun (JP); Katsuhiro Yamashita, Koto-ku (JP); Yasuhiro Tanaka, Chiba (JP); Shusaku Asahina, Inasa-gun (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/804,301

(22) Filed: Mar. 13, 2001

(65) Prior Publication Data

US 2001/0026110 A1 Oct. 4, 2001

(30) Foreign Application Priority Data

Mar. 30, 2000 (JP) .......................... 2000-094867
Mar. 31, 2000 (JP) .......................... 2000-098392

(51) Int. Cl.$^7$ .............................................. B01D 53/06
(52) U.S. Cl. ............................................ 96/125; 55/502
(58) Field of Search ................... 96/125, 130; 95/113; 55/502; 165/8, 10

(56) References Cited

U.S. PATENT DOCUMENTS

| | | | | |
|---|---|---|---|---|
| 2,053,159 A | * | 9/1936 | Miller ......................... 210/189 |
| 3,183,649 A | | 5/1965 | Teller |
| 3,789,916 A | * | 2/1974 | Lindahl ......................... 165/10 |
| 3,800,859 A | * | 4/1974 | Norback ......................... 165/9 |
| 4,452,612 A | * | 6/1984 | Mattia ......................... 95/100 |
| 5,282,975 A | * | 2/1994 | Maryasin et al. ............ 210/691 |
| 5,572,799 A | * | 11/1996 | Masuyuki et al. .............. 34/80 |
| 5,595,238 A | | 1/1997 | Mark et al. |
| 5,628,819 A | | 5/1997 | Mestemaker et al. .......... 96/122 |
| 5,635,091 A | | 6/1997 | Hori et al. ................... 219/136 |
| 6,004,384 A | * | 12/1999 | Caudle ......................... 55/502 |
| 6,155,334 A | * | 12/2000 | Steele ......................... 165/10 |
| 6,361,585 B1 | * | 3/2002 | Anzai et al. ................... 95/113 |

FOREIGN PATENT DOCUMENTS

| | | | |
|---|---|---|---|
| DE | 28 56 184 | | 7/1980 |
| JP | 56-163720 A | * | 12/1981 |
| JP | 5-23526 A | * | 2/1993 |
| JP | 8-219291 A | * | 9/1996 |

OTHER PUBLICATIONS

Patent Abstract of Japan, vol. 1996, No. 12, Dec. 26, 1996 and JP 08 196849 A (Mitsubishi Heavy Ind Ltd).
Patent Abstract of Japan, vol. 017, No. 558 (M–1493) and JP 05 157004 A (Isuzu Motors Ltd. et al.), Jun. 1993.
Patent Abstract of Japan, vol. 2000, No. 04, Aug. 31, 2000 and JP 2000 018388 A (Ishino Gasket Kogyo KK).
Patent Abstract of Japan, vol. 018, No. 338 (M–1628), Jun. 27, 1994 and JP 06 081406 A (Sun A Chem Ind Co Ltd).

* cited by examiner

Primary Examiner—David A. Simmons
Assistant Examiner—Frank M. Lawrence
(74) Attorney, Agent, or Firm—Nixon & Vanderhye P.C.

(57) ABSTRACT

A rotor and a sealing device for a rotary adsorber is disclosed. The rotor includes a rim, spokes, arc-shaped sectors, a calking material, and a thermal insulating seal. The spokes divides the rim into arc-shaped portions. The sectors are disposed in the rim and include a gas adsorptive element. The calking material is provided between each sector and one of the rim and the spoke. The thermal insulating seal covers end surfaces of the spokes and joint portions of the sectors. The sealing device includes a sealing material, a mounting plate, a connecting portion, a rod member, and a spring. The sealing material is slidably interposed between a partitioning frame of the rotary adsorber and the mounting plate. The connecting portion fixes the mounting plate to the partitioning frame. The rod member is fixed to the connecting portion. The spring is interposed between the sealing material and the connecting portion.

15 Claims, 10 Drawing Sheets

ROTOR AND SEALING DEVICE FOR ROTARY ADSORBER

BACKGROUND OF THE INVENTION

1. Field of the Invention

The present invention relates to a rotor for a rotary adsorber of the type in which a partitioning plate mounted on the case defines the end surface of the rotatably held rotor into at least an adsorbing zone, a recycling zone, and a cooling zone, and more specifically, to a rotor for rotary adsorbers provided with arc-shaped sectors formed of a gas adsorptive element of honeycomb construction having a number of small through holes in the cylindrical rim partitioned by spokes radially extending therein into arc-shape portions in cross section, and having calking material interposed between the mating surfaces of these sectors and the combination of the spoke and rim.

Furthermore, the present invention relates to a sealing device for sealing between the end surface of a rotor and a partitioning frame of a casing of the rotary adsorber that clarifies gas containing an organic solvent by passing the same between end surfaces of the rotatable rotor including an adsorptive element to allow the adsorptive element to adsorb an organic solvent and blowing a hot air in the opposite direction to separate and blow off the organic solvent adhered on the absorptive element to recover the adsorptive element to the state in which it can be reused.

2. Description of the Related Art

Referring now to FIGS. 11 to 14, the structure of the rotor for rotary adsorbers of the related art will be illustrated. FIG. 11 is a perspective view showing a principal portion of the rotary adsorber having a rotor rotatably held therein, FIG. 12 is a perspective view of the rotor, FIG. 13 is a cross sectional view of FIG. 12 taken along the line A—A showing seal-mating surfaces of each arc-shaped sector and the spoke, and FIG. 14 is a partially exploded perspective view showing the entire construction of the rotor including the outer peripheral rim 507.

In the rotary adsorber 500 specifically for an organic solvent provided with a conventional adsorptive element 504, adsorbed organic solvent has been removed by rotating the rotor 501 in the holding case 510 that is divided into an adsorbing zone S, a cooling zone T, and a recycling zone U, thereby temporarily defining an adsorbing zone and a recycling zone on one of the end surface of the rotor, adsorbing the organic solvent contained in gas onto the adsorbing element 504 carried by the rotor 501 when the surface of the rotor passes through the adsorbing zone S, and allowing recycling air heated to the temperature higher than 180° C.–200° C., which is a boiling point of an organic solvent, to pass through the adsorptive element 504 from the end surface opposite from the end surface in the recycling zone U.

Among gases containing an organic solvent, a gas generated in the manufacturing process of semi-conductor components, for example contains organic solvents such as DMSO (dimethyl sulfoxide), MEA (monoethanol amine), HMDS (hexamethilenedisilazane), and so on. These organic compounds cannot be removed sufficiently at a recycling temperature of 180 to 200° C. Therefore, such organic compounds are increasingly accumulated on the rotor, which may result in deterioration of performance or burning of the rotor. In order to remove such organic compounds, it is required to send hot air heated to about 200–350° C. to the rotor 501 at the recycling zone U.

The rotor 501 of honeycomb construction integrally formed into a cylindrical shape by combining a plurality of arc-shaped sectors 502 is reinforced by a plurality of metallic spokes 503 extending radially outwardly from the hub 505. The metallic spoke and the sectors 502 of honeycomb construction are joined or bonded by the use of heat resistant calking material 508 such as silicone. In addition, the metallic outer peripheral rim 507 for protecting the outer periphery of the rotor 501 and the honeycomb construction 504 itself are also bonded via a calking material 508 of silicone.

As described above, the rotor 501 is rotatably mounted to the holding case 510, and the partitioning plates 511 for defining the adsorbing zone S, the recycle zone U and the cooling zone T are provided with seal (not shown) formed of silicone rubber with PTFE film applied thereon so as to slidably press against the end surface of the rotor 501 to prevent leakage or mixing of gas passing therethrough.

When attempt was made to send a hot air over 200° C. as described above to the rotor of such a structure for recycling, since a calking material of silicone or rubber could not resist such a high temperature, silicone or rubber was deteriorated and thus the joining performance or adhering performance between the spoke and the rotor was lowered, whereby the arc-shaped sectors constituting the rotor might fall off so that the rotor itself could not be used any more.

Therefore, there was a limit on the temperature of the air to be passed through, and thus the accumulated high boiling organic solvent or polymer could not be removed sufficiently. As a consequence, the cleaning performance was lowered, or when using the solvent that can be polymerized within the rotor in which the solvent is accumulated, it could not be recycled and the polymer gave damage to pores of the adsorptive element like zeolite, thereby lowering the cleaning performance as an adsorptive element.

Next, a conventional sealing device for a rotary adsorber is discussed. As discussed above, an organic solvent adsorber rotatably holds a rotor by a motor in a box-shaped casing having partitioning frame for dividing the surface of the rotor into an adsorbing zone, a recycling zone, and a cooling zone. On the other hand, the rotor includes an adsorptive element forming a plurality of fan-shaped sectors defined by a metallic cylindrical rim, which has a honeycomb construction in which a plurality of pores pass through from one end surface to the other end surface, and has the plurality of fan-shaped sectors inserted in fan-shaped spaces defined by radially extending metallic spokes.

In the actual use, when a gas containing an organic solvent is blown onto the portion of one of the end surfaces of the rotor positioned at the adsorbing zone toward the other end surface thereof, an organic solvent contained in gas is adsorbed and clarified gas is discharged from the other end surface, and the rotor is rotated by a prescribed angle to move from the adsorbing zone to the recycling zone, and then the organic solvent adsorbed thereon is removed by separating and blowing off bypassing a recycling air heated to the temperature higher than 180° C. to 200° C. that exceeds the boiling point of the adsorbed organic solvent from the other side to the one side to recycle the adsorptive element.

In addition, the partitioning frame defining these adsorbing zone and the recycling zone on the end surface of the rotor also includes at least three radially extending partitioning plates and an annular plate or an arc shaped plate facing toward the outer peripheral portion of the end surface of the rotor and defines each fan-shaped zone by being combined with the outer end portion of the partitioning plates.

These partitioning plates are further provided with sealing strips or resilient sealing blocks facing the end surface of the rotor so as to be slidable toward the end surface for preventing mutual interference of air in each fan-shaped zone. Such kind of seal has a disadvantage in that it cannot establish complete sealing performance in the cases where flatness of the end surface of the rotor is not satisfactory as the first problem, and where the end surface of the rotor during rotation does not form a plane exactly perpendicular with respect to the axis of rotation as the second problem.

Especially in the rotary gas adsorber of the type described above, there is a problem in that the rotor develops deflection during rotation so that the end surface of the rotor does not form a perpendicular plane at an exact right angle with respect to the axis of rotation. In addition, these sealing strips or resilient sealing blocks require heat resistance, wear resistance and chemical stability.

SUMMARY OF THE INVENTION

Accordingly, it is a first object of the present invention to provide a rotor for rotary adsorbers provided with a thermal insulating seal that can well resist a high temperature exceeding 200° C. for protecting a calking material applied to the joint portion.

Furthermore, it is a second object of the present invention to provide a sealing device that can establish good sealing performance all the time while following the pits and projections on the surface of the rotor irrespective of the flatness or perpendicularity of the end surface of the rotor in order to overcome the problems described above.

According to the present invention, the first object described above can be achieved by a thermal insulating seal of a plate-shaped incombustible material that covers an end surface of the spoke and the joint portion between the two arc-shaped sectors coming into contact with both sides of the end surface. The thermal insulating seal is mounted on the end surface in parallel with the end surface. This arrangement prevents a heated hot recycling air from being blown directly onto the joint portion between the sectors and the spoke, and thus prevents increase in temperature of calking material, thereby preventing lowering of sealing property or adhering force due to deterioration of calking material. Simultaneously, a hot air is blown onto the adsorptive element other than the portion of the thermal insulating seal, so that a boiling organic solvent or polymer adhered to the adsorptive element is separated and blown off, thereby preventing lowering of adsorbing performance when the adsorptive element itself is reused.

According to a preferred embodiment of the rotor for rotary adsorbers of the present invention, the thermal insulating seal is mounted via a mounting plate welded on the end surface of the spoke. In this arrangement, complex molding process for mounting the thermal insulating seal plate directly on the spoke may be avoided, and replacement thereof can easily be performed.

According to another preferred embodiment of the rotor for rotary adsorbers of the present invention, the thermal insulating seal is secured to the mounting plate by a screw. This arrangement significantly facilitates replacement of the thermal insulating seal.

According to still another preferred embodiment of the rotor for rotary adsorbers of the present invention, the thermal insulating seal extends from the peripheral edge of the rim onto the end surface of the rotor. This arrangement generally prevents a hot air from being blown directly to a calking material between the metallic rim and the outer peripheral surface of the arc-shaped sector, thereby preventing deterioration of a calking material.

According to a further preferred embodiment of the rotor for rotary adsorbers of the present invention, the thermal insulating seal is a silicon nitride plate. In this arrangement preferable, thermal insulating effect is obtained and simultaneous durability of the plate of incombustible material itself is ensured, thereby preventing deterioration of its performance even after many hours of service and having excellent thermal insulating effect.

According to still a further preferred embodiment of the rotor for rotary adsorbers according to the present invention, the thermal insulating seal is a laminated body in which a metal plate is overlaid on a sheet of expanded black lead. In this arrangement, since a sheet of black lead has high heat resistance, and in addition, a metal plate is overlaid thereon, a sheet of expanded black lead, which is fragile in itself, is protected to ensure high toughness and durability, whereby an excellent thermal insulating effect is maintained for a long time.

According to an additional preferred embodiment of the rotor for rotary adsorbers of the present the invention, a heat insulating material is interposed between the mounting plate and the thermal insulating seal. This arrangement alleviates heat transferred to the joined surfaces via the spoke that is exposed to a hot air to some extent by providing a heat insulating material, and a calking material is further protected from a high temperature.

According to another preferred embodiment of the rotor for rotary adsorber of the present invention, the heat insulating material is a calcium silicate plate. This arrangement ensures an excellent heat insulating effect between the heated plate of incombustible material and the mounting plate mounted to the spoke, thereby ensuring protection of a calking material from heat. In the construction of the rotor for rotary adsorber according to the present invention described above, it is preferred to employ silicone resin or fluorine-contained rubber having adhesive property as a calking material.

According to the present invention, the second object described above can be achieved by a sealing device mounted on a partitioning frame fixed to a casing of a rotary gas adsorber for defining at least an adsorbing zone and a recycling zone on the end surface of a rotatable rotor so as to be slidable with respect to the end surface of the rotor. Incombustible sealing material is interposed between the partitioning frame and a mounting plate extending in parallel from the partitioning frame so as to be slidable toward the end surface of the rotor; the mounting plate is fixed to the partitioning frame via a connecting portion; the sealing material is provided with a cylinder hole therein and held by a rod member having an engaging portion extending into the cylinder hole at the tip portion and fixed to the connecting portion with a screw at the rear end thereof so as to be movable along the rod member; and a spring enclosing the rod member is interposed between the sealing material and the connecting portion to resiliently urge the sealing material toward the end surface of the rotor.

In the structure described above, the sealing material, being formed of incombustible material, is not deformed by heat, even when it is brought into contact with the rotor which is exposed to a hot air. In addition, even when the rotor develops deflection during rotation, the sealing material can follow such deflection and be kept in contact with the end surface of the rotor since a resilient force is always applied to the sealing material. Therefore, sealing performance of each zone can be established all the time.

In a preferred embodiment of the present invention, the sealing material is formed of expanded black lead. Since this material has a high heat resistance, it is preferable to use sealing material formed of a material superior in heat resistance and being chemically stable because a hot air flow at the temperature higher than its boiling point of 180–200° C. is blown to the rotor especially at the time of treating gas containing an organic solvent.

In another preferred embodiment of the present invention, the sealing material is graphite. Since this material also has high heat resistance and is superior in wear resistance and in chemical stability, it is quite preferable to use the sealing material in the environment described above.

In a preferred embodiment of the present invention, a resilient sheet strip is inserted between the sealing material and either one or both of the partitioning frame and the mounting plate which hold the sealing material therebetween. Resiliently interposing the sealing material in such a manner serves to absorb the impact applied to the sealing material by the partitioning frame and the mounting plate when the sealing material is subject to an impact during sliding movement on the end surface of the rotor.

In a preferred embodiment of the present invention, the resilient sheet strip is formed of expanded black lead. As characteristics of this material, it is, as a matter of course, superior in heat resistance as described above, but in contrast to it, it is inferior in mechanical strength. Therefore, in order to compensate this disadvantage, expanded black lead having resiliency in addition to heat resistance is preferably used for sealing material. Since expanded black lead is superior in wear resistance in itself, inserting such a resilient sheet strip of expanded black lead between the sealing material and the partitioning frame and mounting plate makes the movement of the sealing material following the end surface of the rotor smoother.

DETAILED DESCRIPTION OF THE PREFERRED EMBODIMENTS

Figure 1:
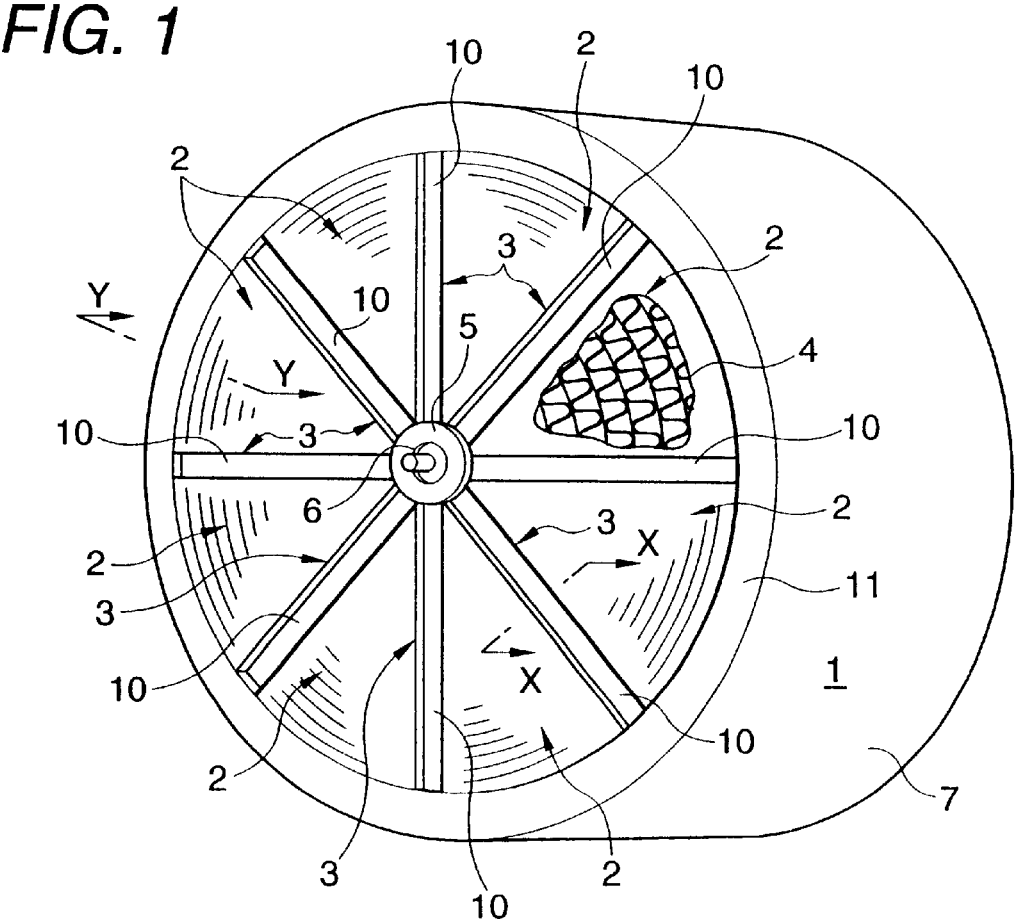
FIG. 1 is a perspective view of a rotor for rotary adsorbers.

Referring now to the drawings, several embodiments of the rotor for rotary adsorber according to the present invention will be described.

Figure 2:
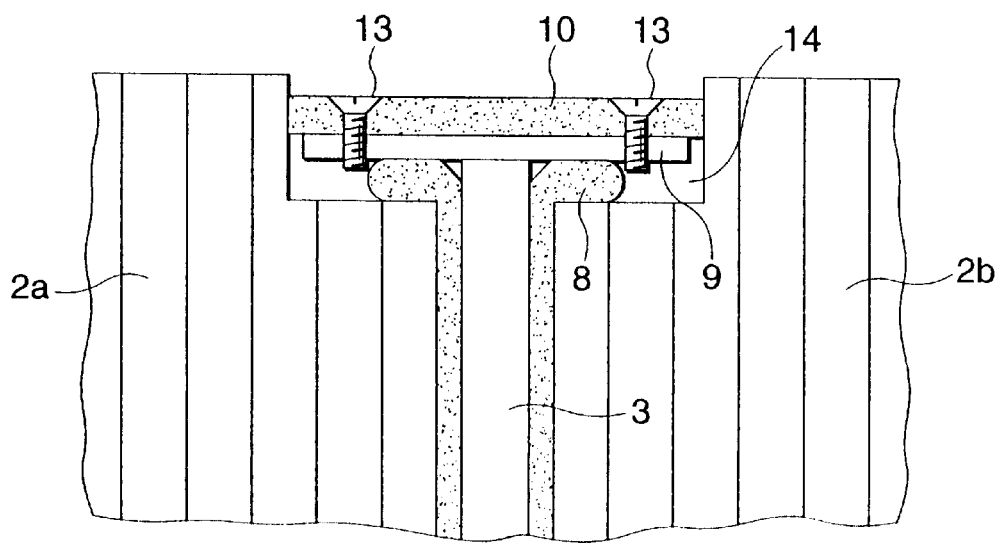
FIG. 2 is a cross sectional view of FIG. 1 taken along the line X—X showing the implementation of the rotor for rotary adsorbers according to the present invention.
Figure 3:
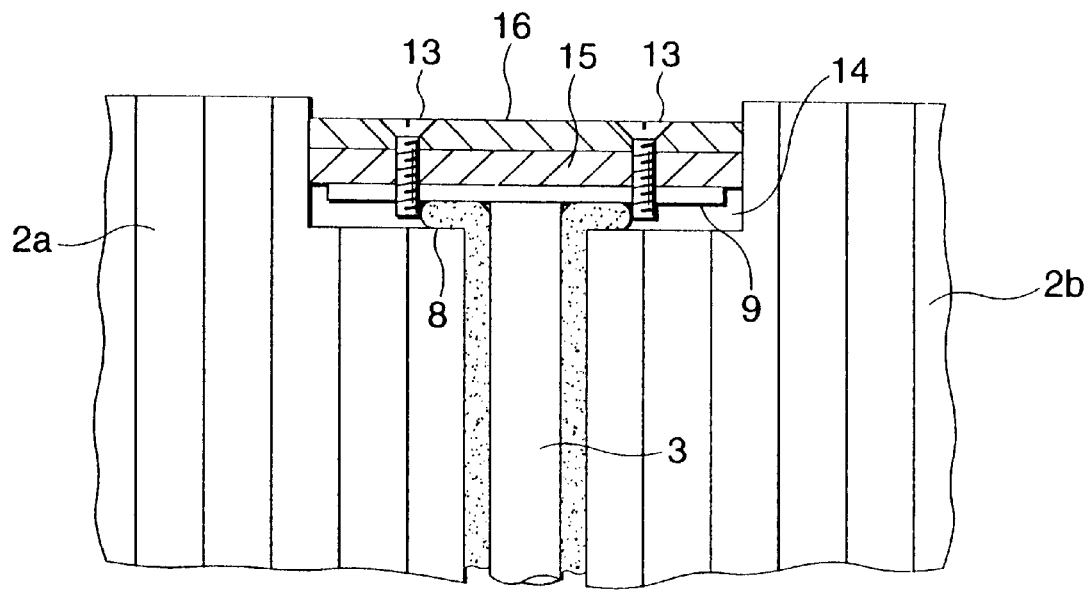
FIG. 3 is a drawing as FIG. 2 showing another embodiment of the rotor for rotary adsorbers according to the present invention.
Figure 4:
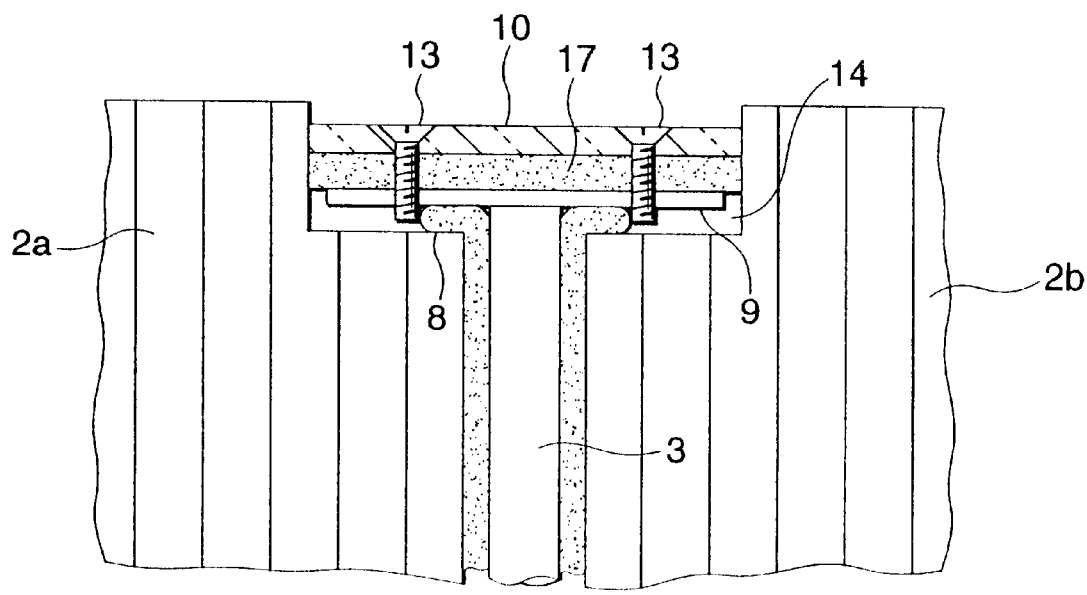
FIG. 4 is a drawing as FIG. 3 showing another embodiment of the rotor for rotary adsorbers according to the present invention.
Figure 5:
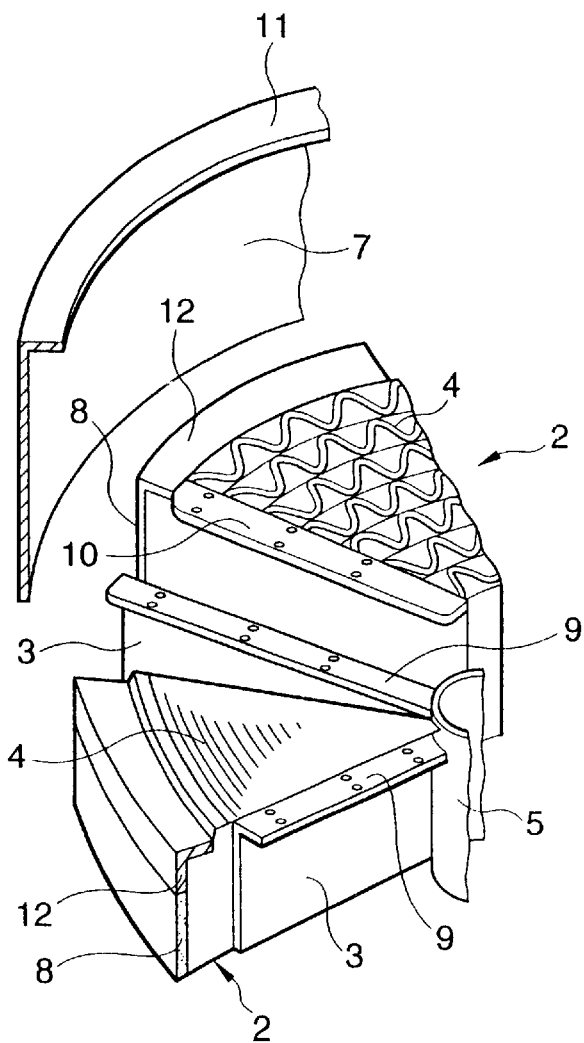
FIG. 5 is a partially exploded perspective view showing the entire construction of the rotor for rotary adsorbers according to the present invention including the outer peripheral rim including a thermal insulating seal.
Figure 6:
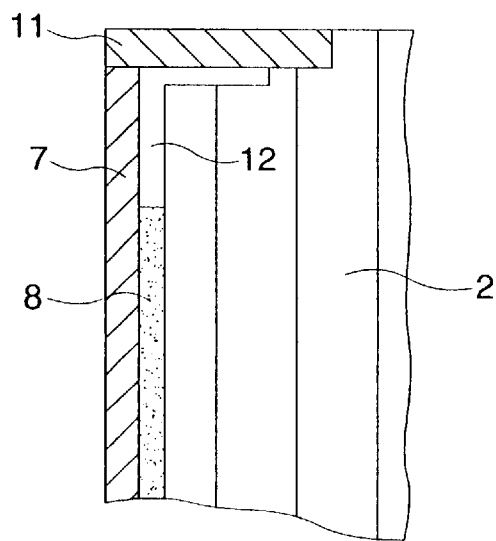
FIG. 6 is a cross sectional view of FIG. 1 taken along the line Y—Y showing the rotor for rotary adsorbers according to the present invention including the outer peripheral rim including the thermal insulating seal.

FIG. 1 is a perspective view of the rotor itself for rotary adsorber according to the present invention; FIG. 2 is a partial cross sectional view of FIG. 1 taken along the line X—X illustrating an embodiment of the rotor for the rotary adsorber according to the present invention; FIG. 3 is a same drawing as FIG. 2 showing another embodiment of the rotor for rotary adsorber according to the present invention; FIG. 4 is a same drawing as FIG. 3 showing another embodiment of the rotor for rotary adsorber according to the present invention; FIG. 5 is a partially exploded perspective view showing the entire construction of a rotor for rotary adsorber according to the present invention including an outer peripheral rim provided with a thermal insulating seal; and FIG. 6 is a cross sectional view of FIG. 1 taken along the line Y—Y of a rotor for the rotary adsorber according to the present invention including outer peripheral rim provided with a thermal insulating seal.

In FIGS. 1 to 6, the thermal insulating seals 9 and 11 of the rotor 1 for rotary adsorbers according to the present invention is provided with eight arc-shaped sectors 2 each including a gas adsorptive element 4 of ceramic fiber paper of honeycomb construction having a number of through holes in the cylindrical rim 7 partitioned into arc-shaped portions in cross section by spokes 3 radially extending therein. The contact surface between adjacent two sectors 2 out of the sectors and the combination of the spoke 3 and rim 7 are integrally formed by silicone joined by a preferable calking material 8. Generally, the rotor including the gas adsorptive element 4 of honeycomb construction has a construction having a number of small through holes extending across both end surfaces, and especially when it is used for the process of cleaning a volatile organic compound containing gas generated in a semi-conductor manufacturing process, a harmful volatile organic compound contained in the gas is adsorbed on the surface of the small through holes when the gas is passed through the small through holes.

Incombustible materials that can be used for the gas adsorptive element 4 of the rotor in the present invention are required to have heat resistance, heat-insulating property, wear resistance, and solvent resistant property. In other words, when the temperature of the rotor increases, the portion between the spokes, which is supporting the rotor, and the honeycomb construction is deformed by high heat, and thus there is no other choice but to use incombustible materials in order to prevent such deformation. The reason why heat resistance is required is because the material has to resist air at a high temperature of 200–350° C., and the reason why heat insulating property is required is because the material have to protect the rotor from the air at a high temperature of 200–350° C. Wear resistance is required because friction is generated between itself and the sealing material described later, and solvent resistant property is required because the rotor has a property of adsorbing organic solvent.

As an incombustible material that satisfies these properties, materials formed of inorganic material such as silicone nitride, graphite, ceramic paper, or felt are employable.

FIG. 1 and FIG. 5 show a state in which the thermal insulating seals 10, 11 formed of plates of incombustible material for the rotor 1 of rotary adsorber are mounted on one end surface of the spoke 3 and the outer peripheral rim 7 of this rotor in parallel therewith, and according to an embodiment of the present invention, these thermal insulating seals are plates of incombustible material; silicone nitride. Especially when such a rotor for rotary adsorber is used in the semi-conductor manufacturing plant, it is inevitable to use a material being highly resistant to an organic solvent because it is always effected chemically by the organic compound containing gas generated during its manufacturing process. Therefore, as one of specific materials, silicone nitride is preferable material. The construction of the present invention will be clearly understood from the description regarding the embodiment shown in FIGS. 2 to 6.

FIG. 2 shows an embodiment of the rotor 1 for rotary adsorber according to the present invention showing the relation between the spoke 3 of the rotor 1 and silicone nitride plate 10 as a thermal insulating seal. The metallic spoke 3 is joined or adhered to the two adjacent sectors 2a, 2b out of six arc-shaped sectors constituting the rotor 1 with a calking material 8. The spoke 3 is provided with a metallic mounting plate 9 welded thereon at a right angle, in other words, in parallel with the end surface of the rotor 1, and the silicone nitride plate 10 is fixed to the mounting plate 9 by a screw 13.

The silicone nitride plate 10 is wider than the mounting plate 9 exposed on the end surface of the rotor in width, and is as wide as it can be fitted into the radially extending rectangular recess 14 in cross section, which is formed at the joint portion between two adjacent sectors 2a, 2b with the spoke 3 interposed therebetween. Therefore, a preferable effect is obtained such that the thermal insulating seal does not project from the end surface of the rotor, so that the collision with the rotor-holding member that can be provided on the partitioning plate 511 of the holding case 510 can be avoided during service.

As shown in FIG. 3, instead of the silicone nitride plate, it is proposed to use an expanded black lead sheet 15 to prevent deterioration of a calking material between the spoke 3 and the adjacent sectors by an expanded black lead sheet 15. However, it is also possible to employ the construction that a metallic plate 16 is overlaid on the expanded black lead sheet 15. The laminated construction may be applied to the thermal insulating seal 11 to be provided on the radially end surface of the rim 7.

As shown in FIG. 4, by providing heat insulating material 17 of, for example, calcium silicate plate between the mounting plate 9 of the spoke 3 and the silicone nitride plate 10, heat insulating performance can be further improved.

FIG. 5 and FIG. 6 are cross sectional drawings of the end surface of the rotor, showing a state in which a silicone nitride plate 11 is mounted at the peripheral edge portion of the metallic outer peripheral rim 7 that appears on the end surface of the arcshaped sector 2. In this arrangement, even when heated air is introduced into the rotor from an area above the drawings, the joint portion is protected from heat by protecting the calking material 8 by a silicone nitride plate 11. In FIG. 6, though it is preferred to provide a metallic angle member 12 under the silicone nitride plate 11 so as to be embedded in the outer peripheral edge portion of the sector, it is also possible to provide the silicone nitride plate 11 alone.

Figure 11:
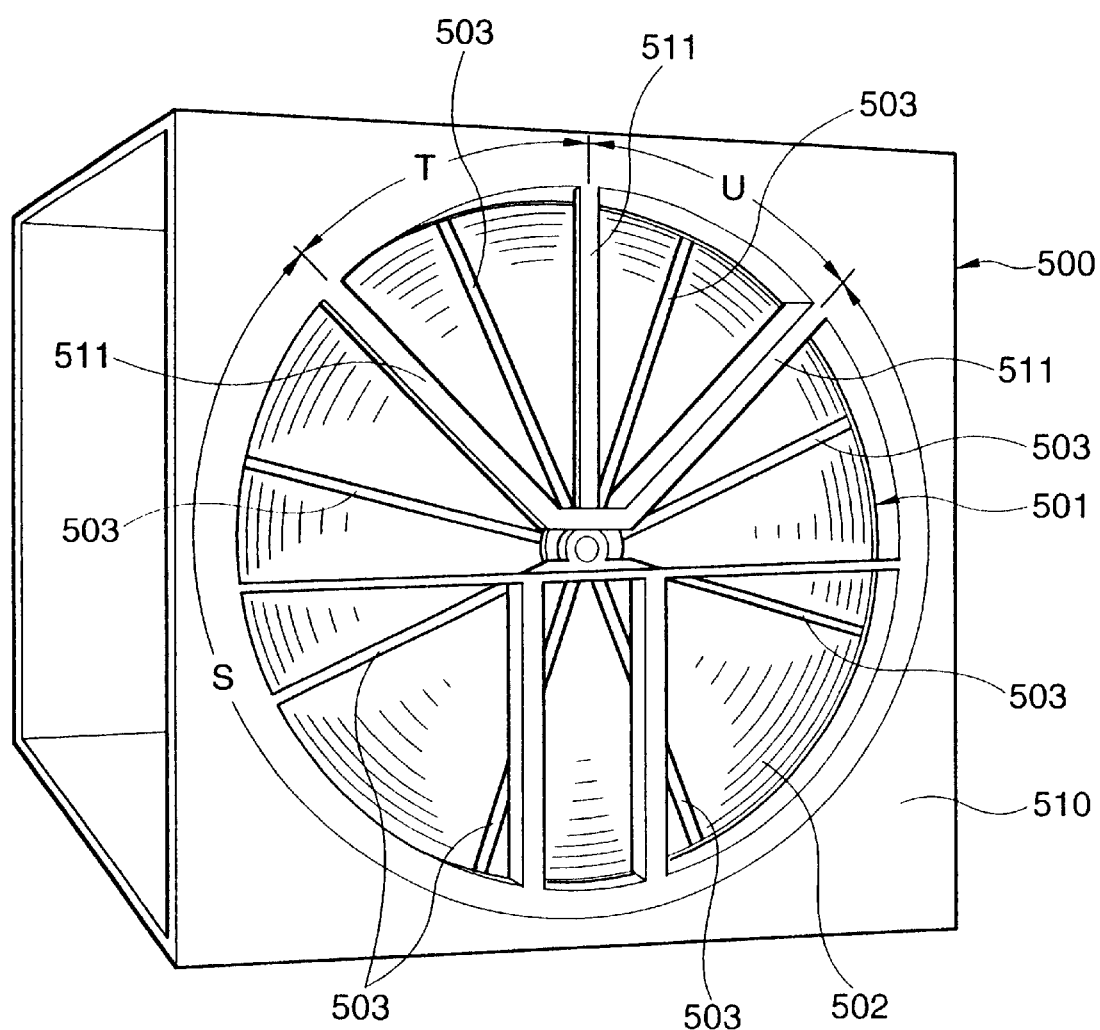
FIG. 11 is a perspective view showing the principal portion of the rotary adsorber including a rotor rotatably held therein according to the related art.
Figure 12:
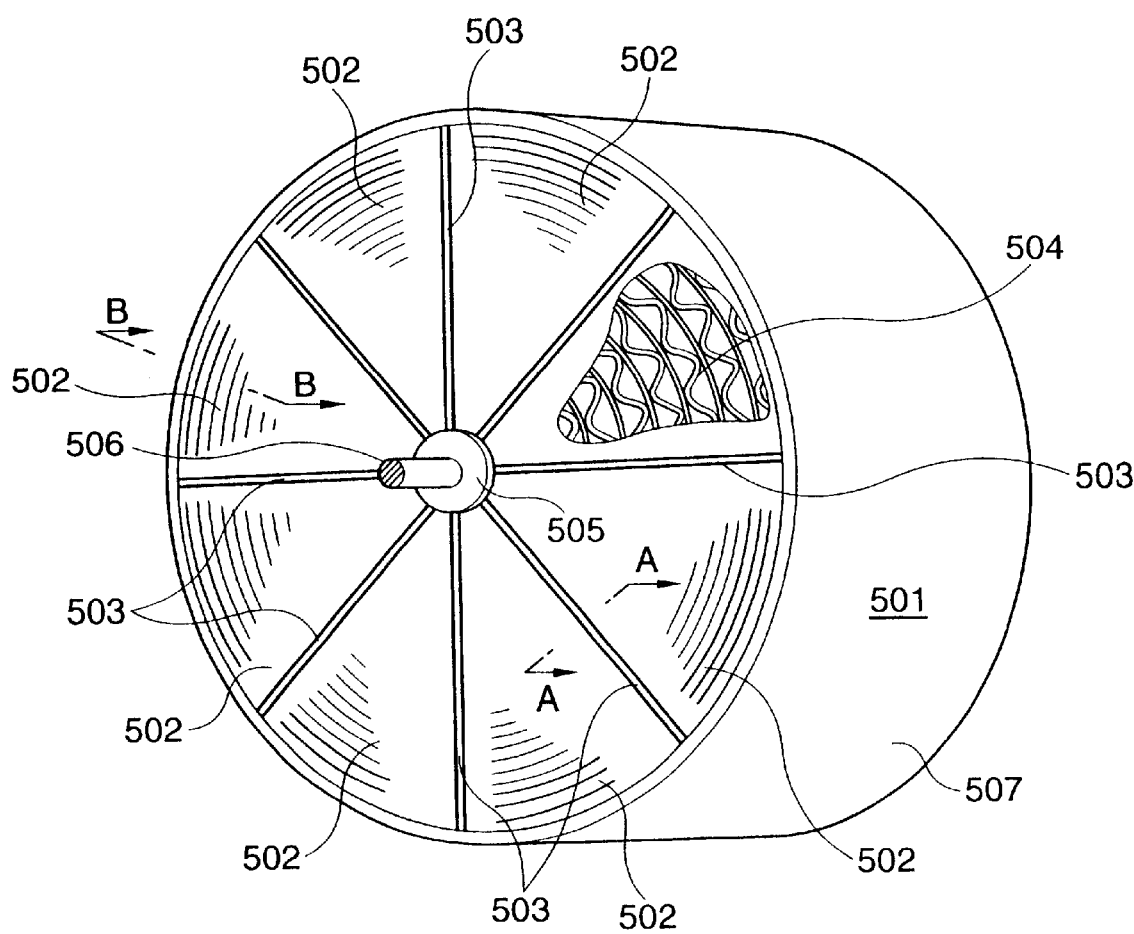
FIG. 12 is a perspective view of the rotor according to the related art.
Figure 13:
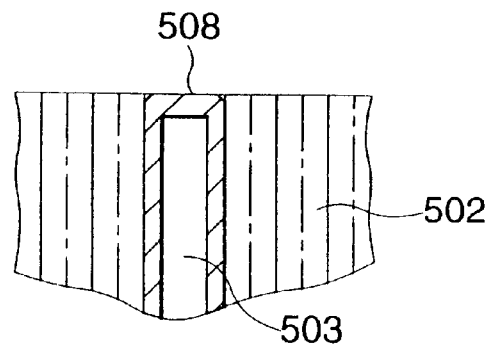
FIG. 13 is a cross sectional view of FIG. 12 taken along the line A—A showing the sealing-adhered portion between each arc-shaped sector and the spoke according to the related art.
Figure 14:
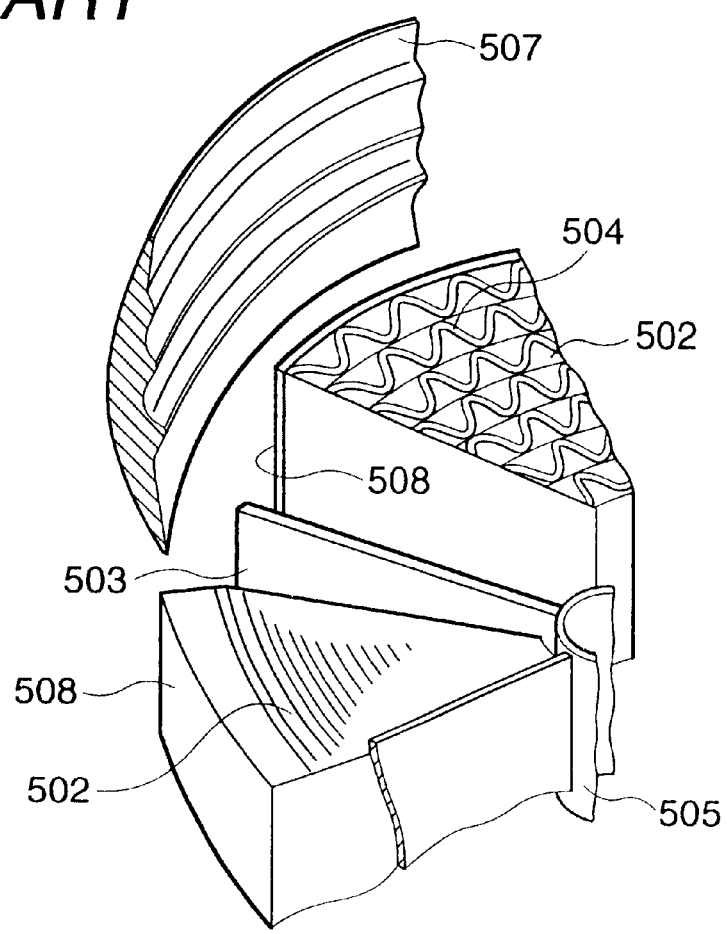
FIG. 14 is a partially exploded perspective view showing the entire construction of the rotor including the outer peripheral rim according to the related art.

In actual use, referring to FIG. 11, the rotor 501 is stored in the case 510. The case 510 can rotatably accommodate the rotor 501, and divide the end surface of the rotor into the adsorbing zone S and the recycling zone U. The recycling zone U interposing the adsorbing zone S and the cooling zone T is divided by the partitioning plate 511 for defining each zone, and the partitioning plate 511 is provided with a sealing material so as to be able to come into contact with the end surface of the rotating rotor to prevent leakage of gas between zones.

As is described thus far, since the rotor for rotary adsorber according to the present invention is constructed in such a manner that arc-shaped sectors formed of a gas adsorptive element of the honeycomb construction having a number of small through holes are arranged in the cylindrical rim partitioned into arc-shaped portions in cross section by the spoke radially extending therein, a calking material is interposed between these respective sectors and the combination of the spoke and rim, and a thermal insulating seal in the shape of a plate formed of incombustible material for covering an end surface of the spoke and the joint surface of the two arc-shaped sectors that come into contact with both sides of the end surface is mounted in parallel with the end surface, even when the high boiling organic solvent in excess of 200° C. or a solvent that can be polymerized both of which were not able to be processed in the related art is attached to the adsorptive element, a hot air higher than 200° C. can be flown into the rotor continuously all the time at the recycle zone without causing deterioration of the calking material such as silicone or the like.

The rotor for rotary adsorbers according to the present invention enables removal of an organic solvent attached onto the adsorptive element, which has been impossible to be cleaned in the related art, and enables the adsorptive element in the rotor to be used continuously and repetitively without lowering the performance thereof and the mechanical strength of the rotor itself. Therefore, quick and smooth operation of exhaust gas processing can be performed continuously, and lowering of efficiency of exhaust gas processing can be prevented, thereby contributing to elongate the life of the rotor significantly.

Next, referring now to the drawings, some embodiments of the sealing device for rotary gas adsorbers according to the present invention will be illustrated.

Figure 7:
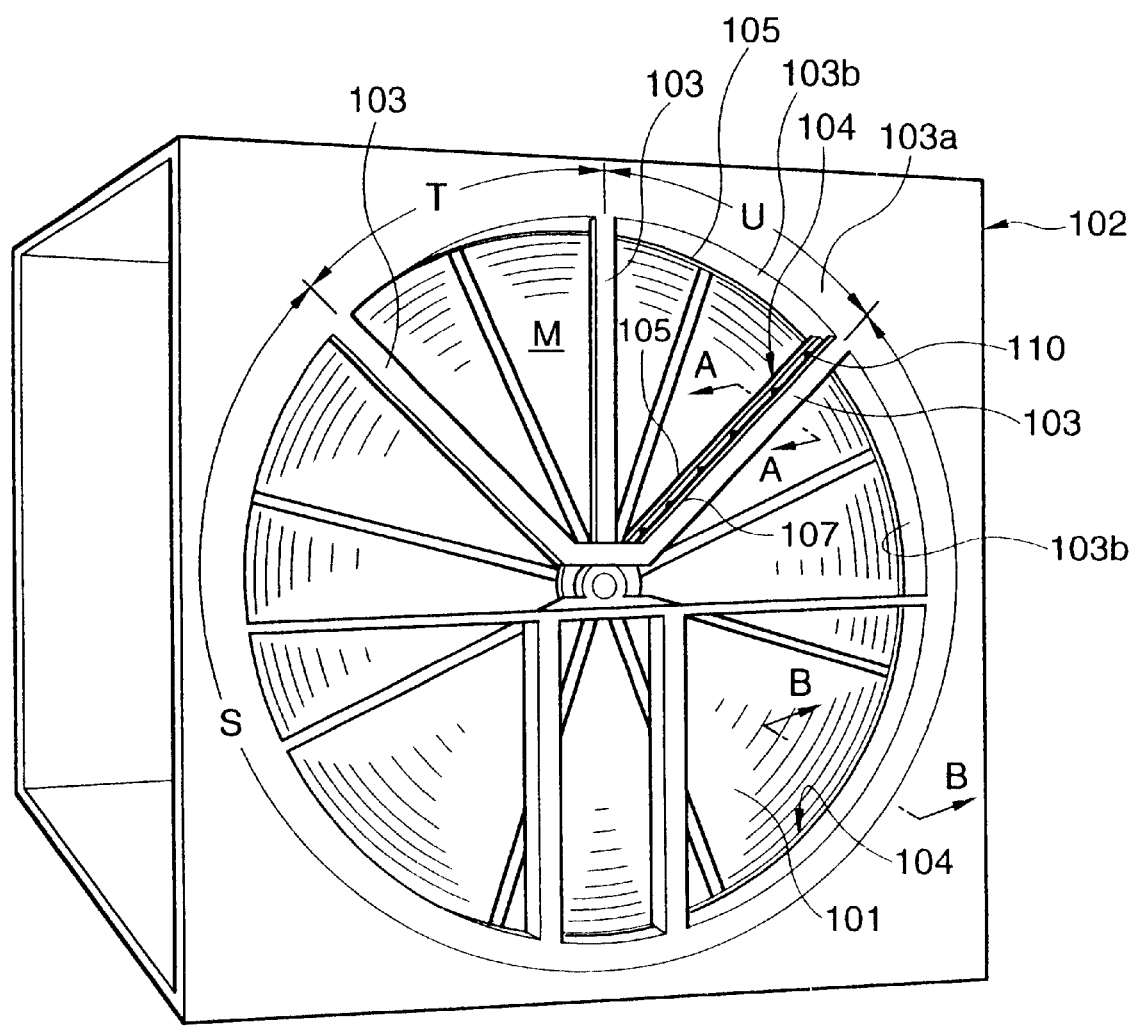
FIG. 7 is a perspective view of the sealing device for rotary gas adsorbers according to the present invention in usual service condition in which the sealing device is accommodated in the case.
Figure 8:
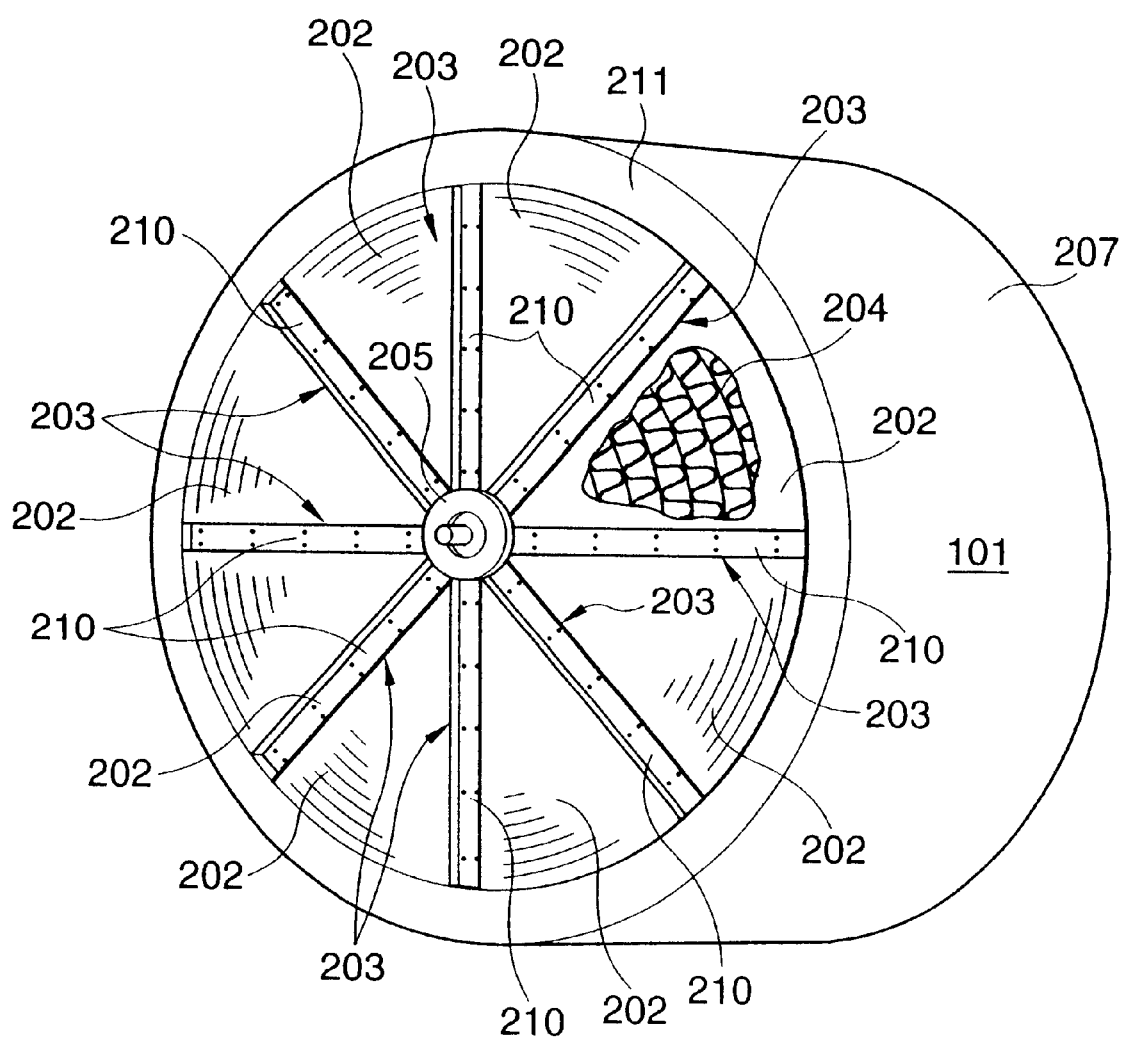
FIG. 8 is a perspective view of the rotor of the type to which the sealing material according to the present invention is applied.
Figure 9:
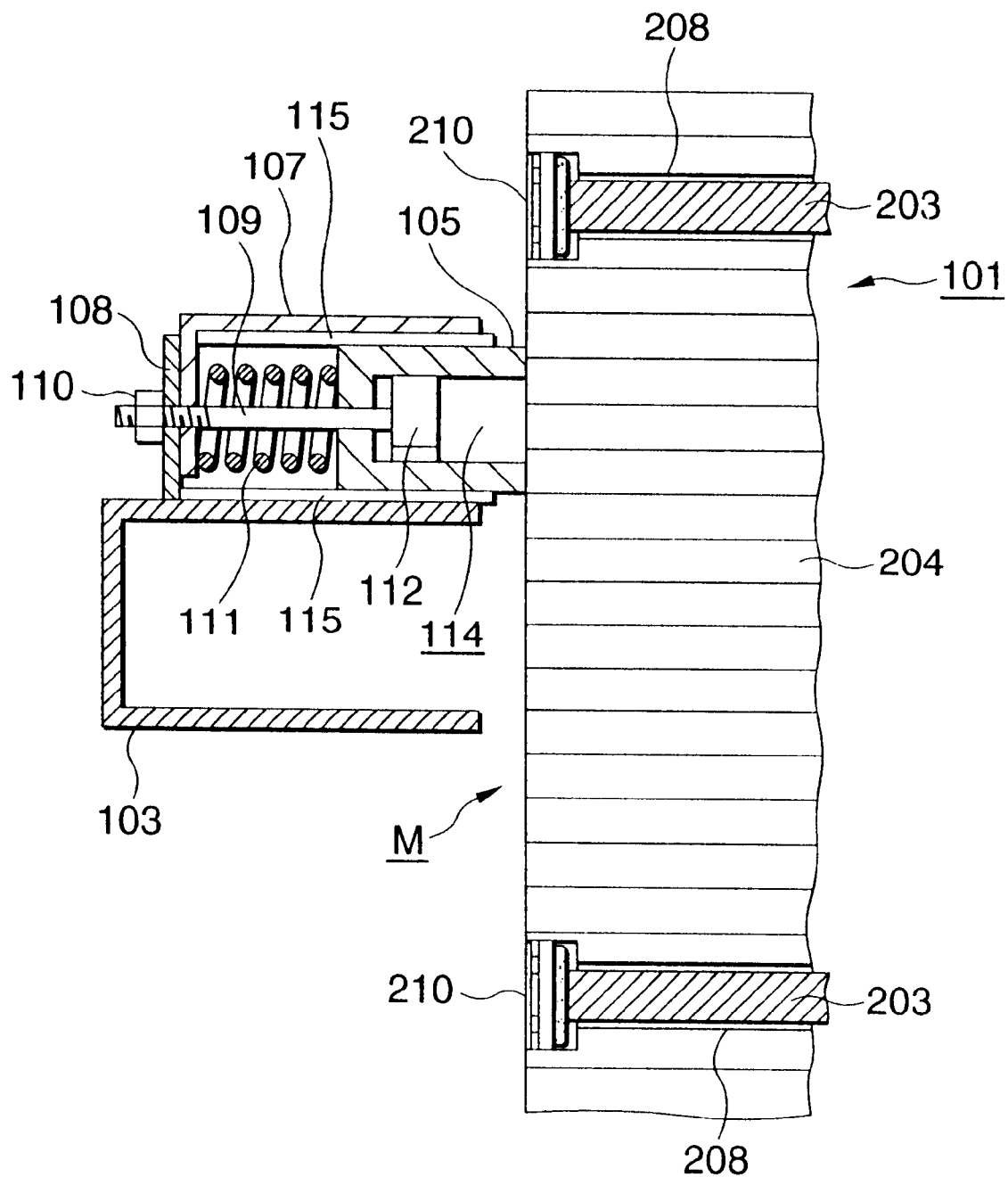
FIG. 9 is a partial cross sectional view of the sealing device of FIG. 7 taken along the line A—A according to the present invention.

FIG. 7 is a perspective view of the sealing device for rotary gas adsorbers according to the present invention in usual service condition in which the sealing device is accommodated in the case; FIG. 8 is a perspective view of the rotor being suitable for using the sealing device according to the present invention and having an end surface applied with a thermal insulating process by covering the joined portion between the combination of the spoke and rim and the fan-shaped sector formed of a adsorptive element with a plate body formed of incombustible material; FIG. 9 is a partial cross sectional view of the sealing device of FIG.

Figure 10:
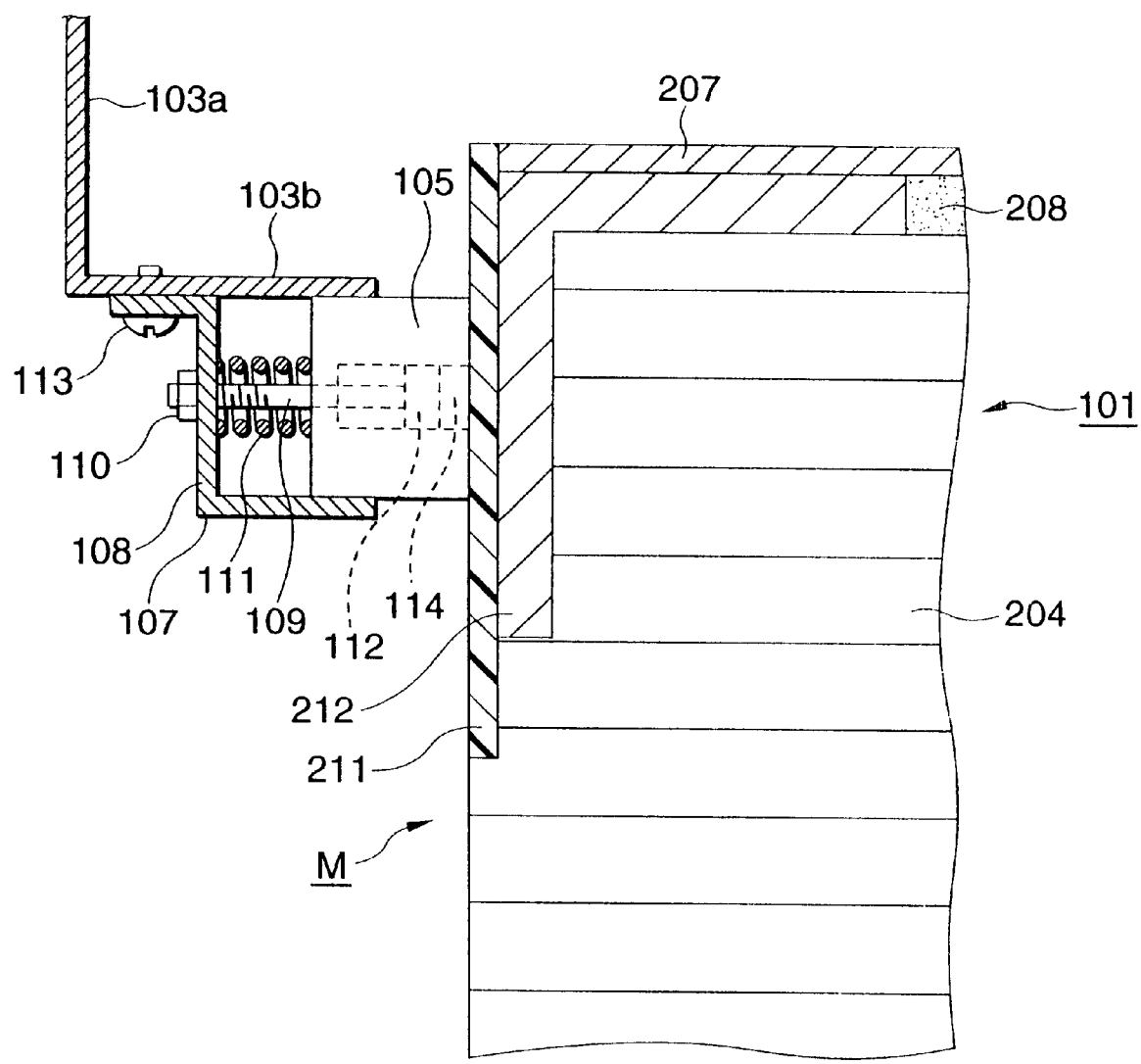
FIG. 10 is a partial cross sectional view as FIG. 9 showing the sealing device of FIG. 7 taken along the line B—B according to the present invention.

7 taken along the line A—A showing a state in which sealing devices according to the present invention are disposed along the radius of the end surface of the rotor; and FIG. 10 is a partial cross-sectional view as FIG. 9 showing the sealing device of FIG. 7 according to the present invention taken along the line B—B, showing a state in which the sealing device is disposed circumferentially along the end surface of the rotor.

In FIG. 7, the case 102 can rotatably accommodate the rotor 101, and here, the end surface of the rotor M is described only regarding the adsorption zone S and the recycling zone U thereof for the convenience of description. In usual service condition, the angular range shown by the sign "T" is a cooling zone. The adsorption zone S and the recycling zone U are divided by the partitioning plates 103 integral with a case 102 for partitioning zones, and the partitioning plate 103 is provided with sealing material 104 to prevent leakage of gas between the respective zones on the end surface of the rotor.

In FIG. 9 and FIG. 10, the linear partitioning plate 103 and the arc-shaped 103b for partitioning between the adsorbing zone and the recycling zone, between the cooling zone and the recycling zone, and between the peripheral portion of the rotor and the peripheral recycling zone is provided with a mounting plate 107 for the sealing material 105 fixed thereon with the nuts 110 (FIG. 9) or a machine screws 113 (FIG. 10). The sealing material 105 to be slid on the rotor 101 is secured to the connecting portion 108, which is fixed to the partitioning plate 103 with the nut 110 and a machine screw 113 in the state being bent at a right angle from the mounting plate 107, with the nut 110 via a rod member 109, and a spring 111 including a coil spring enclosing the rod member 109 is interposed between the connecting portion 108 and the sealing material 105, whereby the sealing material is urged toward the end surface of the rotor resiliently but still slidably by the use of a shock absorbing force and a restoring force of the spring.

The sealing material 105 used here is required to have heat resistance, wear resistance, and chemical stability. Materials suitable for such sealing material will be preferably expanded black lead or graphite. As materials suitable for the spring will be preferably general stainless or a material with a trade name of "Inconel" or the like.

The conventional sealing device has a structure for directly mounting sealing material formed of band-shaped resilient body to the partitioning plate of the case, and thus a malfunction may occur in the rotor being provided with heat resistant thermal insulating seal along the edge of the spoke and the rim. Referring now to FIG. 8, the rotor of the type described above will be described.

In FIG. 8, the rotor 101 includes a spoke 203 (See FIG. 9) radially extending from a hub 205 and a rim 207 annularly surrounding the spoke portion, and a fan-shaped sector 202 including a adsorptive element 204. It has an end surface applied with a thermal insulation process by covering the respective joined portions 208 (See FIG. 9 and FIG. 10) between the combination of spoke and rim and the fan-shape sector with thermal insulating plates 210 and 211 formed of incombustible material. Referring to FIG. 9 and FIG. 10, these thermal insulating plates 210 and 211 are flush with or a bit below the end surface M of the rotor 101.

Though the sealing material exhibits its sealing performance when being slid on the end surface M of the rotor, the sealing material 105 according to the present invention is based on the precondition that it slides on the end surface M applied with a incombustible material as shown in FIG. 9. Therefore, the sealing device of the present invention is constructed in such a manner that the sealing material 105 can follow the pits and projections on the end surface of the rotor with the aid of a resilient force and a restoring force of the spring 111 to ensure smooth sliding movement, thereby establishing a good sealing performance of each operating zone all the time.

The structure of the sealing device shown in FIG. 10 is essentially the same as that shown in FIG. 9. However, a method of mounting the sealing device is slightly changed so that it can slide on incombustible material having a good slipping property provided along the outer peripheral edge of the rotor 101, for example, an annular thermal insulating plate 211 formed of expanded black lead.

Therefore, the folded edge 103b of the outer peripheral edge 103a defining the operating area which is a circular cut-off portion of the surface plate of the case 102 serves substantially as a partitioning frame 103b, and the sealing material 105 is guided between the partitioning frame 103b and a mounting plate 107 extending in parallel thereto, and movably mounted to the rod member 109, which is secured to the connecting portion 108 with a screw, while undergoing a resilient force of the spring 111, which is a coil spring enclosing the rod member 109. Therefore, the sealing device shown in FIG. 10 is disposed only along the arc-shaped portion in the angular range of the recycling zone U of the case 102 in FIG. 7. The reason why the sealing material 104 of the present invention is disposed only along the arc-shaped portion of the recycling zone U is that this region is exposed to a hot air in order to blow off an organic solvent adhered on the adsorptive element.

In the sealing device shown in FIG. 9 and FIG. 10, the sealing material 105 is formed with a cylinder hole 114 in which an engaging portion formed on the tip of the rod member 109 is inserted. The engaging portion has a piston shape that can slidably fit substantially in the cylinder hole 114. In addition, the sealing material 105 includes a resilient sheet strip 115 inserted between the sealing material and either one or both of the partitioning frame 103 and the mounting plate 107 which hold the sealing material therebetween. Resiliently interposing the sealing material 105 in such a manner exhibits a shock absorbing action between the partitioning frame 103 and the mounting plate 107 so that the sealing material is not damaged by the impact applied when the sealing material passes over the pits and projection on the end surface of the rotor during the sliding movement thereon.

In addition, the resilient sheet strip 115 is, as described above, formed of an expanded black lead according to an embodiment of the present invention. This material is quite preferable in increasing heat resistance and wear resistance as well as resiliency as a matter of course.

Since the sealing device for rotary gas adsorbers according to the present invention has such a structure that the sealing material formed of incombustible material is interposed between the partitioning frame and the mounting plate extending from the partitioning frame in parallel thereto so as to be slidable toward the end surface of the rotor, that the mounting plate is fixed to the partitioning frame via the connecting portion, that the sealing material includes a cylinder hole formed therein and is movably held by a rod member having an engaging portion extending into the cylinder hole at the tip portion thereof and secured to the connecting portion with a screw at the rear end thereof, and that a spring enclosing the rod member is interposed between the sealing material and the connecting portion to resiliently urge the sealing material toward the end surface of the rotor, sealing performance between operating zones is significantly improved irrespective of the flatness and perpendicularity of the end surface of the rotor, and lowering of efficiency of the process of exhaust gas is prevented even though the structure is simple, thereby elongating the life of the rotor are obtained.

While only certain embodiments of the invention have been specifically described herein, it will be apparent that numerous modifications may be made thereto without departing from the spirit and scope of the invention.

What is claimed is:

1. A rotor for a rotary adsorber comprising:
   a cylindrical rim;
   spokes radially extending in said cylindrical rim and dividing said cylindrical rim into arc-shaped portions in cross section;
   arc-shaped sectors disposed in said cylindrical rim, each of said sectors including a gas adsorptive element;
   a calking material provided on a mating surface between each sector and one of said rim and said spoke; and
   a thermal insulating seal disposed on an end surface of each of said spokes in parallel with the end surface, the thermal insulation seal being mounted via a mounting plate secured to the end surface of said spoke, wherein said thermal insulating seal covers the end surface of said spoke and a joint portion joining two of said sectors facing both sides of said spoke respectively, and said thermal insulating seal is made of an incombustible material.

2. The rotor for a rotary adsorber according to claim 1, wherein the gas adsorptive element of said sectors includes a honeycomb construction having a plurality of small through holes.

3. The rotor for a rotary adsorber according to claim 1, wherein said mounting plate is welded to the end surface of said spoke.

4. The rotor for a rotary adsorber according to claim 3, wherein said thermal insulating seal is secured on said mounting plate by a screw.

5. The rotor for a rotary adsorber according to claim 1, wherein said thermal insulating seal extends from the peripheral edge of said rim onto an end surface of said rotor.

6. The rotor for a rotary adsorber according to claim 1, wherein said thermal insulating seal is silicone nitride.

7. The rotor for a rotary adsorber according to claim 1, wherein said thermal insulating seal is expanded black lead.

8. The rotor for a rotary adsorber according to claim 1, wherein said thermal insulating seal is a laminated body including an expanded black lead sheet and a metal plate overlaid on the expanded black lead sheet.

9. The rotor for a rotary adsorber according to claim 3, wherein a heat insulating material is interposed between said mounting plate and said thermal insulating seal.

10. The rotor for a rotary adsorber according to claim 9, wherein said heat insulating material is made of calcium silicate.

11. A sealing device for a rotary adsorber, mounted on a partitioning frame which is fixed to a casing of the rotary adsorber and defining at least two zones on an end surface of a rotor of the rotary adsorber, and said sealing device being slidable with respect to the end surface of the rotor, said sealing device comprising:
    an incombustible sealing material including a cylinder hole;
    a mounting plate extending in parallel to the partitioning frame and interposing said sealing material between the partitioning frame and said mounting plate so that said sealing material is slidable toward the end surface of the rotor;
    a connecting portion fixing said mounting plate to the partitioning frame;
    a rod member including an engaging portion extending into the cylinder hole of said sealing material at a tip portion thereof, said rod member fixed to said connecting portion at a rear end thereof so that said sealing material is movable along said rod member;
    a spring enclosing said rod member and interposed between said sealing material and said connecting portion so as to resiliently urge said sealing material toward the end surface of the rotor; and
    a resilient sheet strip inserted between said sealing material and at least one of the partitioning frame and said mounting plate.

12. The sealing device for a rotary adsorber according to claim 11, wherein the two zones are an adsorbing zone and a recycling zone.

13. The sealing device for a rotary adsorber according to claim 11, wherein said sealing material is expanded black lead.

14. The sealing device for a rotary adsorber according to claim 11, wherein said sealing material is graphite.

15. The sealing device for a rotary adsorber according to claim 11, wherein said resilient sheet strip is expanded black lead.

* * * * *